United States Patent
Shah et al.

(10) Patent No.: US 9,282,008 B2
(45) Date of Patent: Mar. 8, 2016

(54) SYSTEMS AND METHODS FOR MONITORING SYSTEM PERFORMANCE AND AVAILABILITY

(71) Applicant: General Electric Company, Schenectady, NY (US)

(72) Inventors: Mohak Shah, San Ramon, CA (US); Scott Charles Evans, Burnt Hills, NY (US); Budhaditya Deb, Niskayuna, NY (US); Anthony Gerard Gargulak, New Berlin, WI (US); Thomas Lasky, Milwaukee, WI (US); Manoj Mehta, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 308 days.

(21) Appl. No.: 13/914,986

(22) Filed: Jun. 11, 2013

(65) Prior Publication Data
US 2014/0365638 A1      Dec. 11, 2014

(51) Int. Cl.
| | | |
|---|---|---|
| G06F 15/173 | (2006.01) | |
| H04L 12/24 | (2006.01) | |
| H04L 29/06 | (2006.01) | |
| H04L 29/08 | (2006.01) | |
| H04L 12/26 | (2006.01) | |

(52) U.S. Cl.
CPC ............. *H04L 41/147* (2013.01); *H04L 63/00* (2013.01); *H04L 67/10* (2013.01); *H04L 41/5012* (2013.01); *H04L 41/5096* (2013.01); *H04L 43/0852* (2013.01); *H04L 43/0888* (2013.01); *H04L 43/16* (2013.01)

(58) Field of Classification Search
CPC ............ H04L 43/0805; H04L 43/0888; H04L 41/147; H04L 67/10; H04L 63/00; H04L 43/16; H04L 41/5096; H04L 41/5012; H04L 43/0852
See application file for complete search history.

(56) References Cited

U.S. PATENT DOCUMENTS 7,330,818 B1 *   2/2008   Ladocsi et al. .................... 705/3
7,409,716 B2     8/2008   Barnett (Continued)

FOREIGN PATENT DOCUMENTS

EP       2469758 A1      6/2012
WO   2012148817 A2     11/2012

OTHER PUBLICATIONS

In-Execution Malware Detection using Task Structures of Linux Processes; Farrukh Shahzad (nexGIN RC), National University of Computer & Emerging Sciences, Islamabad, 44000, Pakistan.

(Continued)

*Primary Examiner* — Krisna Lim
(74) *Attorney, Agent, or Firm* — The Small Patent Law Group LLC; Joseph F. Harding (57) ABSTRACT

A prognostics module includes a systems analysis module and a determination module. The systems analysis module is configured to obtain operational information corresponding to a system-wide operation of a multi-element system. The multi-element system includes multiple elements communicatively coupled by at least one common communication link. The determination module is configured to determine a future health of at least one of the multiple elements of the multi-element system using the operational information corresponding to the system-wide operation of the multi-element system.

21 Claims, 4 Drawing Sheets

(56) References Cited

U.S. PATENT DOCUMENTS

| | | | |
|---|---|---|---|
| 7,581,434 B1* | 9/2009 | Discenzo et al. | 73/53.01 |
| 7,720,013 B1 | 5/2010 | Kelliher | |
| 8,245,301 B2 | 8/2012 | Evans | |
| 8,245,302 B2 | 8/2012 | Evans | |
| 8,312,542 B2 | 11/2012 | Eiland | |
| 8,327,443 B2 | 12/2012 | Eiland | |
| 2004/0058652 A1 | 3/2004 | McGregor et al. | |
| 2007/0165541 A1 | 7/2007 | Arpee | |
| 2008/0033991 A1* | 2/2008 | Basak et al. | 707/104.1 |
| 2008/0146334 A1* | 6/2008 | Kil | 463/36 |
| 2008/0235080 A1* | 9/2008 | Chess et al. | 705/10 |
| 2011/0319726 A1 | 12/2011 | Sachanandani et al. | |
| 2012/0002569 A1 | 1/2012 | Wong et al. | |
| 2012/0089417 A1 | 4/2012 | Bardy et al. | |
| 2012/0259978 A1 | 10/2012 | Petersen et al. | |
| 2013/0035571 A1 | 2/2013 | Alonso et al. | |
| 2013/0143561 A1 | 6/2013 | Nuss et al. | |

OTHER PUBLICATIONS

PCT Search Report and Written Opinion from corresponding PCT Application No. PCT/US2014/041254 dated Oct. 30, 2014.
Cortes et al., "Support-Vector Networks", Machine Learning, Sep. 1995, vol. 20, Issue 3, pp. 273-297.
Bougaev et al., "R-functions Based Classification for Abnormal Software Process Detection", Computational Intelligence and Security Lecture Notes in Computer Science, 2005, vol. 3801, pp. 991-996.
Wac et al., "Measurements Based Performance Evaluation of 3G Wireless Networks Supporting m-health Services", Multimedia Computing and Networking, vol. 176, Jan. 2005, pp. 12.
Schwabacher, "A Survey of Data-Driven Prognostics", Proceedings of the AIAA Infotech@Aerospace Conference, Sep. 2005.
"Parallel Workloads Archive", Dec. 8, 2005. http://www.cs.huji.ac.il/labs/parallel/workload.
Vachtsevanos et al., "Intelligent Fault Diagnosis and Prognosis for Engineering Systems", John Wiley & Sons Inc, 2006.
Liang et al., "BlueGene/L Failure Analysis and Prediction Models", International Conference on Dependable Systems and Networks, pp. 425-434, Jun. 2006.
Schwabacher et al., "A Survey of Artificial Intelligence for Prognostics", Proceedings of the AAAI Fall Symposium, 2007.
Wac et al., "Context-Aware Qos Provisioning in an M-Health Service Platform", International Journal Internet Protocol Technology, vol. 2, Issue 2, 2008.
Lan et al., "A Fault Diagnosis and Prognosis Service for TeraGrid Clusters", Proceedings of TeraGrid 2007 Conference, 2007.
Urmanov, "Electronic Prognostics for Computer Servers", Reliability and Maintainability Symposium 2007 RAMS '07 Annual, Jan. 2007.
Al-Masri et al., "QoS-based Discovery and Ranking of Web Services", Computer Communications and Networks, 2007 ICCCN 2007. Proceedings of 16th International Conference, pp. 529-534, Aug. 2007.
Al-Masri et al., "Investigating Web Services on the World Wide Web", Proceedings of the 17th international Conference on World Wide Web, 2008. pp. 795-804.
Coble et al., "Prognostic Algorithm Categorization with PHM Challenge Application", Proceedings of the 2008 International Conference on Prognostics and Health Management, Oct. 2008.
Chandola et al., "Anomaly Detection a Survey", ACM Computing Surveys, vol. 43, Issue 3, Sep. 2009.
Wac et al., "Quality of Service Predictions Service: QoS Support for Proactive Mobile Applications and Services", Quality of Service Predictions Service, pp. 23-44, 2009.
"The Computer Failure Data Repository (CFDR)", Usenix, Feb. 2009. https://www.usenix.org/cfdr.
Urmanov et al., "Prognostics in Data Centers", Sun Micro System, pp. 1-21, May 2009. http://www.stanford.edu/class/ee392m/Lecture7Urmanov.pdf.
Zhou et al., "Multidimensional Analysis of System Logs in Large-scale Cluster Systems", The Proceeding of 38th Annual IEEE/IFIP International Conference on Dependable Systems and Networks (DSN 2008), Jun. 2009.
Zhenyu, Fang, "Resource Management on Cloud Systems with Machine Learning", Master's Thesis, Technical University of Catalonia, Jul. 20, 2010.
Shi et al., "Learning Configuration Files for Automatic Fault Diagnosis", International Conference on Program Comprehension (ICPC), 2011.
Zheng et al., "Co-analysis of RAS Log and Job Log on Blue Gene/P", International Parallel & Distributed Processing Symposium (IPDPS), May 2011, pp. 840-851.
"The QWS Dataset" website from Qusay H. Mahmoud, Ph.D., University of Ontario Institute of Technology, Oshawa, ON, Canada: http://www.uoguelph.ca/~qmahmoud/qws/.
Al-Masri et al. "Discovering the Best Web Service", WWW 2007 pp. 1257-1258.

* cited by examiner

SYSTEMS AND METHODS FOR MONITORING SYSTEM PERFORMANCE AND AVAILABILITY

BACKGROUND

As application systems transform from conventional device-centric architectures to cloud or other network based systems that utilize shared computing resources, conventional approaches for assessing availability and/or quality of service may suffer from a number of drawbacks. Conventional approaches may not be suited to analysis beyond that of a single device or isolated system. Further, the scale, complexity, and additional dependencies associated with cloud type computing networks provide additional challenges to those faced by conventional techniques for assessing availability and/or quality of service.

BRIEF DESCRIPTION

In one embodiment, a prognostics module is provided including a systems analysis module and a determination module. The systems analysis module is configured to obtain operational information corresponding to a system-wide operation of a multi-element system. The multi-element system includes multiple elements communicatively coupled by at least one common communication link. The determination module is configured to determine a future health of at least one of the multiple elements of the multi-element system using the operational information corresponding to the system-wide operation of the multi-element system.

In another embodiment, a method is provided including obtaining operational information corresponding to a system-wide operation of a multi-element system that includes multiple elements communicatively coupled by at least one common communication link. The method also includes determining, at one or more processing modules of a prognostics system, a future health of at least one of the multiple elements of the multi-element system using the operational information corresponding to the system-wide operation of the multi-element system.

In another embodiment, a tangible and non-transitory computer readable medium that includes one or more computer software modules is provided. The one or more computer software modules are configured to direct one or more processors to obtain operational information corresponding to a system-wide operation of a multi-element system comprising multiple elements communicatively coupled by at least one common communication link. The one or more computer software modules are also configured to direct the one or more processors to determine a future health of at least one of the multiple elements of the multi-element system using the operational information corresponding to the system-wide operation of the multi-element system.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments utilize one or more of computing system data, network log data, physics based models, or statistical information to assess the health of a multi-element system. For example, the computing resources of a cloud based patient monitoring system may be assessed, and/or a future health of one or more aspects of the patient monitoring system may be predicted or estimated. Further, the provisioning of the patient monitoring system may be assessed. Further still, the patient monitoring system may be assessed or analyzed to determine if the patient monitoring system will become unavailable or will fail to meet a quality of service threshold, such as a maximum value for a skin to screen delay.

In various embodiments, a systems prognostics module or system may be configured to mine computational log data and/or to utilize physics based models to identify conditions of risk for a multi-element system (e.g., a cloud based system including various edge devices or systems interconnected via a cloud arrangement). Machine learning may be employed to develop models such as algorithms trained using historical data to identify conditions indicative of risk. For example, supervised learning from system data logs labeled with an outcome such as "fatal error" may be used with machine learning algorithms such as support vector machines to produce a model. The model may be applied against a window of logs to predict failure. As another example, unsupervised learning or clustering may be used, for instance along with principal component analysis, to determine categories of web services using quality of service attributes. The clusters may be labeled and used to assess system performance, categorize web services, and/or guide changes. As yet one more example, physics based models may be used to predict failure. In various embodiments, physics based models may take inputs such as input memory use, data rate, or other statistical inputs. In various embodiments, a combination or fusion of different methods of model development or type (e.g., supervised learning, unsupervised learning, and physics based) may be employed.

In various embodiments, the prediction of failures or determination of future health may be utilized to drive warnings and/or automatic system responses to address or mitigate an issue or concern. For example, a process may be switched to an alternate server, a new server may be brought online, and/or a different communications channel may be utilized to assure availability and/or to improve end-to-end quality of service. Further still, in various embodiments, security system parameters may be input to differentiate malicious from non-malicious failure modes.

At least one technical effect of various embodiments is improved determination of a future health of a multi-element system. At least one technical effect of various embodiments is improved determination of a future health of one or more aspects of a multi-element system. At least one technical effect of various embodiments is the providing of remedial measures to mitigate or otherwise address a future health concern or issue associated with at least one aspect of a multi-element system. At least one technical effect of various embodiments is improvement in the ability to utilize cloud or similar networking structures to leverage shared computing resources and/or to decrease the cost and increase the reach of complex systems, such as patient monitoring systems. At least one technical effect of various embodiments includes improved identification of indicators for predicting system faults and/or potential deterioration in quality of service in a multi-element system.

Figure 1:
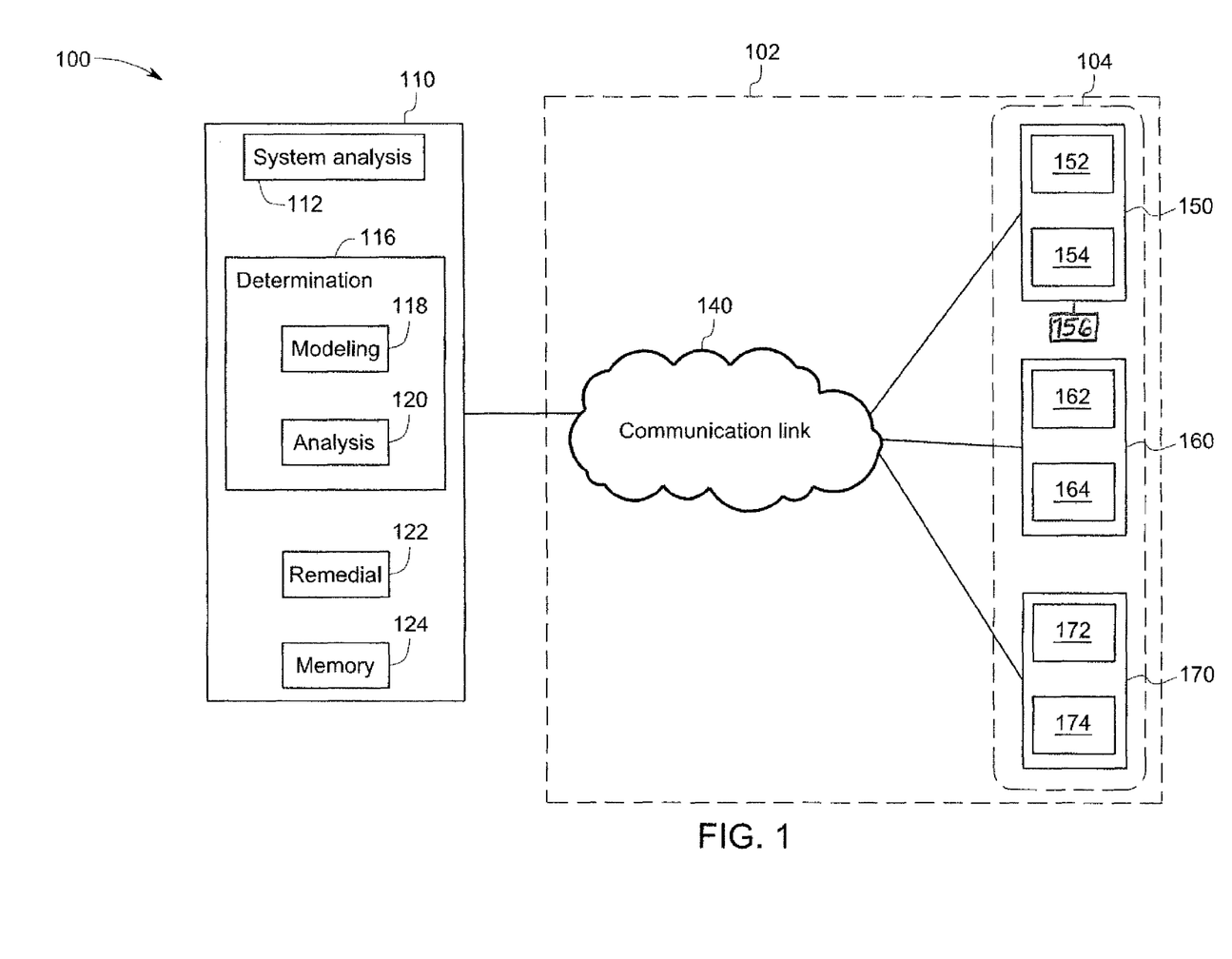
FIG. 1 is a schematic block diagram of a system in accordance with various embodiments.

FIG. 1 is a schematic block diagram of a system 100. The system 100 includes a multi-element system 102 that includes a group 104 of elements joined by a common communication link 140. As used herein, a multi-element system may be understood as a system including plural devices, systems, or subsystems joined by at least one communication link that cooperate to perform one or more functional tasks as part of an intended operation. Various of the plural devices, systems, or subsystems, as well as the communication link, may be owned, operated, or administered by different entities or parties. The depicted system 100 also includes a systems prognostics module 110 operably connected to the common communication link 140. Generally, the systems prognostics module 110 is configured to receive operational information regarding the multi-element system 102 and to determine a future health of one or more aspects of the multi-element system 102 using the operational information. In contrast to conventional prognostic analyses that may be limited to the analysis of a single device or element (e.g., a functional system or sub-system), various embodiments perform prognostic analyses on a system-wide basis for a multi-element system (e.g., to determine a health for the multi-element system 102 and/or to determine a health for an aspect or sub-system of the multi-element system 102 using operational information corresponding to the multi-element system 102). In various embodiments, a prognostic analysis on a system-wide basis may be understood as an aggregate analysis of components of the multi-element system 102 (e.g., an aggregate analysis of edge devices or systems interconnected by a cloud arrangement).

In various embodiments, a future health of the multi-element system 102 may be determined. Alternatively or additionally, the systems prognostic module 110 may use information regarding system-wide operation of the multi-element system 102 (e.g., information regarding web service or other information regarding system operation) to determine a future health of a portion or aspect of the multi-element system 102, and/or use information from one aspect of the multi-element system 102 (e.g., operational information from one or more particular elements or portions of the multi-element system 102) to prognosticate a future health and/or control other aspects of the multi-element system 102. For example, systems-wide operational information may be analyzed to prognosticate a future health or expected life of a multi-element system and/or a particular aspect of the system. As another example, the operation of a first aspect of a system may be controlled based on such a prognosticated future health, for instance, to improve an operational parameter of a second distinct aspect of the system and/or to improve an operational parameter of the overall system.

In the embodiment depicted in FIG. 1, the group 104 of elements includes three discrete functional systems, or subsystems of the multi-element system 102. Each of the elements of the group may be configured as a free-standing or independent device or system, and, in various embodiments, may be owned, operated, or administered by a different party or entity than other elements of the group 104. Namely, the group 104 of elements includes a data acquisition system 150, a processing system 160, and a display system 170. In alternate embodiments, fewer, additional, and/or different types of functional systems may be present. Generally, as used herein, a functional system is configured to perform a useful or productive task. The functional systems described herein may be configured as edge devices configured to connect to a cloud. Thus, functional systems may enable data access via client devices. Functional systems may be used for a variety of tasks and/or in a variety of industries. By way of example, functional systems may be utilized in energy, aviation, oil and gas, healthcare, rail transport, or the like. Further still, in various embodiments, a given functional system may include an individual device or facility, a component or system of a device or facility, and/or a group or fleet of devices or facilities. By way of example, a given functional system may include an aircraft, one or more engines of an aircraft, or a fleet of aircraft. Examples of functional systems associated with aviation include aircraft, aircraft engines, and components or aspects thereof. Examples of functional systems associated with energy include turbines, engines, motors, control systems, power plants, transformers, cooling towers, and components or aspects thereof. Examples of functional systems in healthcare include imaging devices, detectors or sensors of physiological parameters, servers, workstations, monitors, and components or aspects thereof. Examples of functional systems in rail transportation include battery management systems, locomotives, wayside devices, and components or aspects thereof. A given functional system, for example, may include one or more programmable logic controllers (PLCs) for controlling one or more aspects of the given functional system. In various embodiments, the functional systems (e.g., the data acquisition system 150, the processing system 160, and the display system 170) may be understood as nodes of a network of the multi-element system 102.

The data acquisition system 150, the processing system 160, and the display system 170 will be discussed herein in connection with a health care system; however, in other embodiments, functional systems associated with other industries or applications may be employed. For example, the data acquisition system 150 may be configured to include one or more sensors or detecting systems configured to obtain, for example, physiological data or anatomical information of a patient. The processing system 160 may be configured to receive information from the data acquisition system 150 and to process the received information. For example, the data acquisition system 150 may be configured to collect imaging data, the processing system 160 may be configured to reconstruct an image using the imaging data received from the data acquisition system 150, and the display system 170 may be configured to provide a display of the image reconstructed by the processing system 160. In various embodiments, the data acquisition system 150, the processing system 160, and the display system 170 may be owned, administered, or operated by a single party or entity, while in other embodiments, various of the data acquisition system 150, the processing system 160, and the display system 170 may be owned, operated, or administered by different entities.

For example, in some embodiments, the data acquisition system 150 may be administered or operated by a first health care organization, the processing system 160 may be administered or operated by a service provider, and the display system 170 may be administered or operated by a second health care organization. Further, one or more networking aspects and/or the communication link 140 may be administered by one or more additional providers, such as IT service providers. As just one example, in various embodiments, a first health care organization may operate a data acquisition system, such as a mobile or remote detection system (e.g., a mobile or remote imaging system). Data collected by the first health care organization may be transmitted via the communication link 140 to a processing system administered, for example, by a third party software provider, for processing of the data (e.g., to reconstruct an image). The processed data (e.g., a reconstructed image) may then be sent to a display system administered by a second health care organization (e.g., a hospital, clinic, or the like) for analysis and diagnosis. The above discussion is provided by way of example and not limitation, as other arrangements may be employed in various embodiments. For example, more than one data acquisition system 150, processing system 160, or display system 170 may be used in various embodiments. As another example, the processing system 160 and the display system 170 may be combined as a single unit or system owned, operated, or administered by a single party. As just one more example, the data acquisition system 150 and the processing system 160 may be combined as a single unit or system owned, operated, or administered by a single party.

It should be noted that each of the data acquisition system 150, the processing system 160, and the display system 170 may include a functional portion and a networking portion. The functional portion may be configured to perform a useful task, and the networking portion may be configured for communicatively linking the given system with other systems. In various embodiments, the networking portion and the functional portion of a given data acquisition system, processing system, or display system may be owned, administered, or operated by a single entity (e.g., a hospital or other health care organization), while in other embodiments, the networking portion and the functional portion may be administered by different entities. For example, a hospital or other health care organization may administer the functional portion while an IT service provider administers the networking portion.

As shown in FIG. 1, the data acquisition system 150 includes a data acquisition portion 152 and a networking portion 154. It should be noted that the depiction of the data acquisition system 150 is intended as schematic in nature and for illustrative purposes only. For example, a given component, sub-system, or aspect of the data acquisition system 150 may have both a data acquisition portion 152 and a networking portion 154 dedicated thereto or otherwise associated therewith. In various embodiments, plural data acquisition portions 152 and/or networking portions 154 may be present in various functional systems 150. The data acquisition portion 152 may in turn be comprised of plural sub-portions or subsystems. For example, the data acquisition portion 152 may include one or more input devices (e.g., keyboard, scanner, or bar code reader, among others). As another example, the data acquisition portion 152 may include one or more detection devices. In various embodiments, the data acquisition portion 152 may include one or more sensors or detection devices configured to obtain physiological data of a patient. By way of example, the data acquisition portion 152 may include an imaging system, an EKG or other circulatory detection system, a capnography detection system, or a pulse oximeter, among others.

In the illustrated embodiment, the data acquisition system 150 also includes a monitoring sensor 156 operably connected to the physical portion. The monitoring sensor 156 may be configured to sense or detect a parameter corresponding to an operational state of the data acquisition system 150. Alternatively or additionally, the monitoring sensor 156 may be configured to sense or detect a parameter corresponding to an environmental state of the data acquisition system 150, such as temperature or humidity corresponding to an environmental condition. Information from the monitoring sensor 156 may be provided to the systems prognostics module 110 and used in addition to system-wide operational information to determine a future health of one or more of the data acquisition system 150, the multi-element system 102 and/or the group 104 of elements. Information provided from the monitoring sensor 156 to the systems prognostics module 110 may be provided in a raw form (e.g., as detected or sensed by the sensor 156) and/or pre-processed.

The networking portion 154 of the data acquisition system 150 of the illustrated embodiment is configured to communicate with outside (e.g., other than the data acquisition system 150) systems or entities. Such communication may be accomplished through wired connections and/or wireless connections. As one example, the networking portion 154 may receive information from and/or provide information to a separate system or entity over a network such as the internet. As another example, the networking portion 154 may share information via a cloud arrangement. As still another example, the network portion 154 may share information via media storage devices, such as hard drives, thumb drives, or the like. The networking portion 154 in the illustrated embodiment may be configured to one or more of communicate information obtained by the data acquisition portion 152 to the processing system 160; to communicate information obtained by the data acquisition portion 152 to the display system 170; to receive control or direction for operation of the data acquisition system 150 from the processing system 160 and/or the display system 170 (and/or an entity operating the processing system 160 and/or the display system 170); or to communicate operational information obtained by the network portion 154 and/or the monitoring sensor 156 to the system prognostics module 110 via the communication link 140, among others. The networking portion 154 may include ports for communicating with other systems or entities. Such ports may include network connections or aspects thereof, USB ports (e.g., for accepting a thumb drive), or the like.

As shown in FIG. 1, the processing system 160 includes a processing portion 162 and a networking portion 164. It should be noted that the depiction of the processing system 160 is intended as schematic in nature and for illustrative purposes only. For example, a given component, sub-system, or aspect of the processing system 160 may have both a processing portion 162 and a networking portion 164 dedicated thereto or otherwise associated therewith. In various embodiments, plural processing portions 162 and/or networking portions 164 may be present in various processing systems 160. Generally, in various embodiments, the processing portion 162 is configured to receive information from one or more functional systems 150 via the communication link 140 and/or the networking portion 164, and to filter, modify, analyze, or otherwise process the information received. For example, the processing portion 162 may be configured to receive imaging data and to reconstruct an image using the imaging data. As just one more example, the processing portion may be configured to receive information collected from a sensor that detects electrical impulses associated with the cardiac cycle, and to provide an EKG or other representation of the cardiac cycle of a patient.

The networking portion 164 of the processing system 160 of the illustrated embodiment is configured to communicate with outside (e.g., other than the processing system 160) systems or entities. Such communication may be accomplished through wired connections and/or wireless connections. As one example, the networking portion 164 may receive information from and/or provide information to a separate system or entity over a network such as the internet. As another example, the networking portion 164 may share information via a cloud arrangement. As still another example, the network portion 164 may share information via media storage devices, such as hard drives, thumb drives, or the like. The networking portion 164 in the illustrated embodiment may configured to one or more of receive information obtained by the data acquisition portion 152 or other aspect of the data acquisition system 150 for processing; to communicate processed information to the display system 170; to receive control or direction for operation of the processing system from the data acquisition system 150 and/or the display system 170 (and/or an entity operating the data acquisition system 150 and/or the display system 170); or to communicate operational information obtained by the network portion 154 and/or other aspect of the processing system 160 to the system prognostics module 110 via the communication link 140, among others. The networking portion 164 may include ports for communicating with other systems or entities. Such ports may include network connections or aspects thereof, USB ports (e.g., for accepting a thumb drive), or the like.

As shown in FIG. 1, the display system 170 includes a display portion 172 and a networking portion 174. It should be noted that the depiction of the display system 170 is intended as schematic in nature and for illustrative purposes only. For example, a given component, sub-system, or aspect of the display system 170 may have both a display portion 172 and a networking portion 174 dedicated thereto or otherwise associated therewith. In various embodiments, plural display portions 172 and/or networking portions 174 may be present in various processing systems 170. Generally, in various embodiments, the display portion 172 is configured to receive information from the data acquisition system 150 and/or the processing system 160 via the communication link 140 and/or the networking portion 174, and to provide a display corresponding to the received information. The display portion 172, for example, may include one or more of a screen configured to provide a visual display, a printer configured to provide a printout or hard copy, or a speaker or alarm, among others. For example, in various embodiments, the display system 170 may receive information corresponding to a reconstructed image provided by the processing system 160, and may provide a display on a screen for viewing by a practitioner. Further, the display system 170 may be configured to allow for manipulation or additional processing of an image by a viewer. In various embodiments, the display system 170 may include or be configured as a workstation and/or personal computer (PC). In various embodiments, the display system 170 may be configured as a monitor.

The networking portion 174 of the display system 170 of the illustrated embodiment is configured to communicate with outside (e.g., other than the display system 170) systems or entities. Such communication may be accomplished through wired connections and/or wireless connections. As one example, the networking portion 174 may receive information from and/or provide information to a separate system or entity over a network such as the internet. As another example, the networking portion 174 may share information via a cloud arrangement. As still another example, the network portion 174 may share information via media storage devices, such as hard drives, thumb drives, or the like. The networking portion 174 in the illustrated embodiment may configured to one or more of receive information obtained by the data acquisition system 150 and/or the processing system 160 for processing; to receive control or direction for operation of the processing system from the data acquisition system 150 and/or the processing system 160 (and/or an entity operating the data acquisition system 150 and/or the processing system 160); or to communicate operational information obtained by the network portion 174 and/or other aspect of the display system 170 to the system prognostics module 110 via the communication link 140, among others. The networking portion 174 may include ports for communicating with other systems or entities. Such ports may include network connections or aspects thereof, USB ports (e.g., for accepting a thumb drive), or the like.

In various embodiments, the systems prognostics module 110 may be understood as a prognostics system or sub-system, and may be configured to determine a future health of the multi-element system 102 and/or one or more portions or aspects of the multi-element system 102. As indicated above, the depicted systems prognostics module 110 is configured to receive operational information regarding the multi-element system 102 and to determine a future health of one or more aspects of the multi-element system 102 using the operational information. The operational information may include information corresponding to one or more of an environment of one or more aspects of the multi-element system, performance information corresponding to the operation of one or more aspects of the multi-element system, security information corresponding to cyber or other threats to one or more aspects of the multi-element system, or the like.

In various embodiments, the systems prognostics module 110 is configured to predict a future health, state, or condition of one or more elements (e.g., one element, plural elements, portion of system, or system as a whole) using information corresponding to the functioning of the system as whole. The operational information received may be operational information corresponding to a systems-wide operation, such as, as one example, information corresponding to communications or other logs for communications between various aspects of the multi-element system 110, or, as another example, information corresponding to a systems-wide performance parameter of the multi-element system 102. In various embodiments, the operational information may further include information corresponding to the operation of an aspect of the system. For example, the operational information may include information provided by the monitoring sensor 156 of the data acquisition system 150. The systems prognostics module 110 in various embodiments may be operated, administered, or utilized by one or more of an owner or operator of one or more of the functional systems 150, 160, 170; a vendor, manufacturer, distributor, or other provider of one or more of an owner or operator of one or more of the functional systems 150, 160, 170; or a service provider engaged in the maintenance of one or more of an owner or operator of one or more of the functional systems 150, 160, 170. Additionally or alternatively, the systems prognostics module 110 may be operated, administered, or utilized by an owner or operator of the communication link 140. In still other embodiments, the systems prognostics module 110 may be operated, administered, or utilized by a party or entity that is not otherwise affiliated with the communication network 140 and/or the functional systems 150, 160, 170.

In the illustrated embodiment, the communication link 140 is configured to provide one or more paths of communication between the functional systems 150, 160, 170 as well as between the functional systems 150, 160, 170 and the systems prognostics module 110. In some embodiments, the communication link 140 may be configured as a cloud arrangement. In various embodiments, the communication link 140 may be configured as a private network or cloud arrangement with limited access, or may be configured as a public network or cloud. Further, the communication link 140 may provide communication between one or more functional systems 150, 160, 170 and one or more additional functional systems and/or outside (e.g., external to system 100) entities and/or systems (not shown). In various embodiments, the health and/or security of the communication link 140 may also be monitored and/or analyzed by the systems prognostics module 110, and/or operational information regarding the communication link 140 may be used in monitoring or analyzing (e.g., determining a future health) of one or more aspects of the multi-element system 102.

As discussed herein, the systems prognostics module 110 in the depicted embodiment is configured to obtain operational information (e.g., physical diagnostic information and/or cyber security data regarding the multi-element system 102), and to determine a state of the multi-element system 102 (or aspect thereof) using the obtained operational information. In various embodiments, the systems prognostics module 110 may also be configured to determine an expected life for the one or more aspects of the multi-element system 102 using the obtained operational information. The state of the multi-element system 102 (and/or a projected or estimated life of the multi-element system 102) may be determined, for example, using one or models based on historical information corresponding to the operational information. Such models, for example, may be determined, developed, or otherwise constructed using machine learning techniques (e.g., supervised machine learning or unsupervised machine learning, among others). In various embodiments, the systems prognostics module 110 may be owned, operated, or administered by a common party or entity as one or more aspects of the multi-element system 102, while in other embodiments, the systems prognostics module 110 may be owned, operated, or administered by an entity or party that does not own, operate, or administer a portion of the multi-element system 102.

The systems prognostics module 110 (and/or various modules or sub-modules of the systems prognostics module 110) may be understood in various embodiments as a processing module. The systems prognostics module 110 may be configured as one or more computer processors or other logic-based devices that perform operations based on one or more sets of instructions (e.g., software). The instructions on which the systems prognostics module 110 operates may be stored on a tangible and non-transitory (e.g., not a transient signal) computer readable storage medium, such as a memory 124. The memory 124 may include one or more computer hard drives, flash drives, RAM, ROM, EEPROM, and the like. Alternatively, one or more of the sets of instructions that direct operations of the systems prognostics module 110 may be hard-wired into the logic of the systems prognostics module 110, such as by being hard-wired logic formed in the hardware of the systems prognostics module 110.

As depicted in FIG. 1, the systems prognostics module 110 includes a systems analysis module 112, a determination module 116, a remedial module 122, and a memory 124. Generally, in various embodiments, the systems analysis module 112 may be configured to obtain operational information regarding the multi-element system 102 via the communication link 140. The systems analysis module 112 may, for example, receive information regarding the multi-element systems 102 such as data sets or logs, and may process or parse the data sets or logs to provide inputs configured for a model (e.g., a model developed by the determination module 116), and/or perform other filtering or processing of the received operational information. The determination module 116, in various embodiments, may be configured to determine a future health of the multi-elements system 102 or an aspect or portion thereof based on information obtained from the systems analysis module 112. Further, the determination module 116 may be configured to determine one or more models used to determine the future health. The remedial module 122 may, in various embodiments, be configured to one or more of identify one or more aspects of the multi-element system 102 that correspond to an issue or potential problem, identify one or more aspects of the multi-element system 102 that may be modified or controlled to address or mitigate an issue or potential problem, or direct a change to the multi-element system 102 to address or mitigate an issue. For example, a structural change (e.g., replacement of an identified component or aspect of the multi-element system 102, repair or maintenance of an identified component or aspect of the multi-element system 102, upgrading of an identified component or aspect of the multi-element system 102, or the like) may be directed by the remedial module 122. Alternatively or additionally, an operation change regarding the operation of one or more aspects of the multi-element system 102 may be directed by the remedial module 122. The embodiment depicted in FIG. 1 is intended as schematic in nature and is provided by way of example for illustrative purposes. It should be noted that, in various embodiments, one or more of the modules (or aspects of a module) depicted may be integrated into or with one or more other modules, and/or one or modules (or aspects of a module) may be split or subdivided into additional modules or additional sub-modules.

In the illustrated embodiment, the systems analysis module 112 is configured to obtain operational information corresponding to a system-wide operation of the multi-element system 102. The operational information corresponding to a system-wide operation of the multi-element system 102 may include one or more of information corresponding to the performance or operations of one or more communication links or networking modules or portions, the performance of a system-wide operation, or one or more parameters corresponding to measures of system performance. The systems analysis module 112 may also parse, filter or otherwise process the operational information obtained. For example, a model (e.g., a model specified by the determination module 116) may utilize as inputs certain types of operational information. The systems analysis module 112 may parse or filter the operational information to remove information not utilized as inputs to the model, and provide the remaining operational information (e.g., the operational information to be utilized by the model) to the determination module 116. In various embodiments, the operational information may include logs of system activity. Further, in some embodiments, individual device information (e.g., a performance measure of a particular aspect or element of the multi-element system 102, a system log for one or more of the particular functional systems, or the like) may be obtained by the systems analysis module 112 and/or utilized by the determination module 116.

The operational information may include current and/or historical information. The operational information may include physical diagnostic information that may describe, depict, or otherwise correspond to an operational (or functional) and/or environmental state of one or more aspects of the multi-element system 102. The operational information may include information regarding cyber parameters such as process system data. Such parameters may define the semantics and behavior of an executing process, and thus may be understood as physical diagnostic information as used herein, in that such parameters relate or correspond to an operational or functional state of the system. These parameters may, for example, describe or correspond to when a process was last run, how much central processing unit (CPU) time the process has accumulated, how much of that time was spent in a kernel mode, how much of that time was spent in a user mode, how much memory was used, or the like. Additionally or alternatively, the operational information may include cyber security information regarding one or more aspects of the multi-element system 102. As used herein, the term "cyber" may be understood as pertaining to computers or networks. Cyber security data thus may relate in various embodiments to the security of information systems, computers, networks, or the like. Cyber security may also be understood in various embodiments as relating to information security. Cyber security attacks may include attacks such as viruses, spoofing, malware, or the like. Cyber security data may include results of a security scan. Additionally or alternatively, cyber security data may include raw data, metadata, programs, logs or the like.

In the illustrated embodiment, the determination module 116 is configured to determine a future health of at least one of the elements of the multi-element system 102 using the operational information corresponding to the system-wide operation of the multi-element system. For example, a health of a component or aspect based may be determined not on information limited to or strictly pertaining to that particular component or aspect, but may be determined based on operational information pertaining or corresponding to the entire multi-element system 102, a portion of the multi-element system 102 other than the particular component or aspect, or a portion of the multi-element system 102 including the particular component or aspect along with other components or aspects. The determination module 116 may obtain pre-processed information from the systems analysis module 112 in some embodiments, while in other embodiments the information obtained may not be pre-processed by the systems analysis module 112. In various embodiments, the determination module 116 is configured to obtain the operational information, and to determine a state (e.g., a future health such as an expected life and/or whether or not a threshold of a performance parameter is satisfied) of the multi-element system 102 or an aspect thereof using the operational information. Further, in some embodiments, the determination module 116 may be configured to identify if the state corresponds to one or more of a non-malicious condition or a malicious condition.

In the embodiment depicted in FIG. 1, the determination module 116 of the illustrated embodiment includes a modeling module 118, and an analysis module 120. The modeling module 118 is configured to develop one or more models for identifying a state (e.g., a future health of the multi-element system 102 or an aspect thereof) or condition of the multi-element system 102. The analysis module 120 is configured to determine the state or condition, for example, using one or more models developed by the modeling module 118 and the operational information obtained from the systems analysis module 112. In various embodiments, the analysis module 120 may be configured to project an estimated life of the functional system (e.g., via the use of one or more models developed by the modeling module 118). The estimated life may correspond to an estimated time until a fatal error (or other type of error) is expected to be encountered, and/or to an estimated time when a performance parameter (a system-wide performance parameter and/or a performance parameter for a particular aspect or aspects of the multi-element system 102) is expected to drop below a desired, required, or otherwise predetermined threshold.

The modeling module 118 is configured to develop one or more models to one or more of determine a state (e.g., a performance parameter, an expected life, or other measure of health) of one or more aspects of the multi-element system 102 or determine how far along a given state has developed. The determined state may correspond to one or more of the entire multi-element system 102, a group of elements of the multi-element system 102, or a particular aspect or portion of the multi-elements system 102. Models may also be used to identify features of interest (e.g., portions or aspects of operational information that may be used as inputs of a model) that may be used to determine the state or condition of the multi-element system 102 or one or more aspects thereof. Plural models may be combined, for example, by ensemble or fusion techniques. In various embodiments, historical data and/or running totals of parameters may be utilized to develop or modify models. In some embodiments, machine learning may be employed to develop one or more models. In various embodiments, one or both of physical diagnostic information or cyber information may be used to assess the state. In various embodiments, both system-wide information and information pertaining to a particular aspect or aspects of a system may be employed as inputs to a model for determining the state.

The modeling processes in various embodiments may be understood as including a number of steps. For example, a model may be developed by generating data, extracting features of interest, and then designing classifiers (or identifiers). In various embodiments, the generating of data may include collecting data and correlating the data to a known process being executed by a system (or saving the data for correlation to a subsequent identification of the process being executed). Data may be collected for both normal and/or malicious processes. The data may then be analyzed to determine one or more features or parameters that may be used to build a model to identify a particular process (or state associated with a process). Statistical descriptors and/or shapes associated with the data may be used to identify and/or extract features. Features may then be selected for use with one or more models. For example features which are observed to differ for various processes may be selected in conjunction with construction of a model, while features that tend not to differ for various processes may be discarded. The model may be designed such that the selected features may be used to provide an output (a signature, chart, graph, or the like) used to distinguish the processes for which data has been generated. In some embodiments, the model may be a physics-based model based on known properties of a system. Additionally or alternatively, data driven models may be employed.

For example, in various embodiments, data sets may be collected and analyzed to determine relationships between one or more types of data and one or more of expected faults, errors, or the like and/or performance parameters. For instance, data sets or logs may be mined to identify data useful in prognosticating impending failure, impending degradation of quality of service, or the like. As one example, a web services data set consisting of various Quality of Web Service (QWS) measurements may be collected using, for example, a web service broker framework. Types of Quality of Service (QoS) information collected may include, for example, response time, availability, throughput, successability, reliability, compliance, best practices, latency, or documentation, among others. Various attributes may be weighted or normalized to generate service classifications based on an overall quality rating. In various embodiments, web services logs may be utilized as part of an unsupervised machine learning process, with the data providing "natural groupings" that may be identified to categorize the data.

For example, histogram profiles of selected attributes may be analyzed to understand the attribute value landscape across the web services. In various embodiments, a principle component analysis (e.g., an orthogonal transformation of data by eigenvalue decomposition) may be employed to provide dimensions or variables with the highest variance that may be used to explore the data (e.g., visually). In various embodiments, unsupervised machine learning techniques may be employed. For example, a k-means clustering algorithm may be employed.

As another example, in various embodiments, service logs of high performing computer environments (e.g., environments configured to provide cloud services) may be generated. In some embodiments, one or more logs such as a reliability, availability, and serviceability (RAS) log, job log, or the like may be employed to collect data for building and/or using a model. For instance, an RAS log may provide information regarding notable events occurring in a high performing computer environment, and a job log may provide application level information to further delve into the root cause analysis of a particular problem or issue, and/or may help differentiate between software and hardware failures. Further, for example, use of a job log in conjunction with an RAS log, may be useful in filtering out redundant entries. Generally, in various embodiments, features or entries of logs may be identified so that fatal events, such as an application crash, hardware crash, or severe loss of service may be predicted using information regarding preceding errors in various embodiments.

To predict fatal errors based on preceding log entries, in various embodiments, Support Vector Machine (SVM) based classifiers may be employed. For example, relevant information may be extracted from the RAS logs. Logs may be parsed, for example, one line at a time to extract values of different fields. For each unique value of each RAS field, a unique code index may be generated. Using the indexes, the RAS log may then be converted into a code book with actual words associated with each field converted to an index entry. To determine whether a given type of error, for example fatal, may be predicted based on preceding lines, a fixed window of log entries preceding each fatal error may be analyzed to create feature vectors. For example, a window describing the collection of lines may be based on a fixed number of lines, a fixed time window, or the like. As one example, a fixed window of 500 lines may describe a block of logs.

In various embodiments, keywords, denoted by index entries in a code book, may be used as features to classify if a preceding block of long entries denotes a block leading to a fatal error or a non-fatal error. The keyword entries may be used to create feature vectors for different blocks of log entries. The feature vectors may be understood as histograms of keywords appearing in a fixed length block of log entries. For fatal blocks, all entries with a severity field equal to "Fatal" may be considered and used to generate feature vectors with log entries preceding the fatal event. For non-fatal entries, entries in the log without a severity field equal to "Fatal" may be considered and used to generate feature vectors belonging to non-fatal events. The generated feature vectors may then be utilized with a supervised learning techniques, for example with SVM based classifiers.

Figure 2:
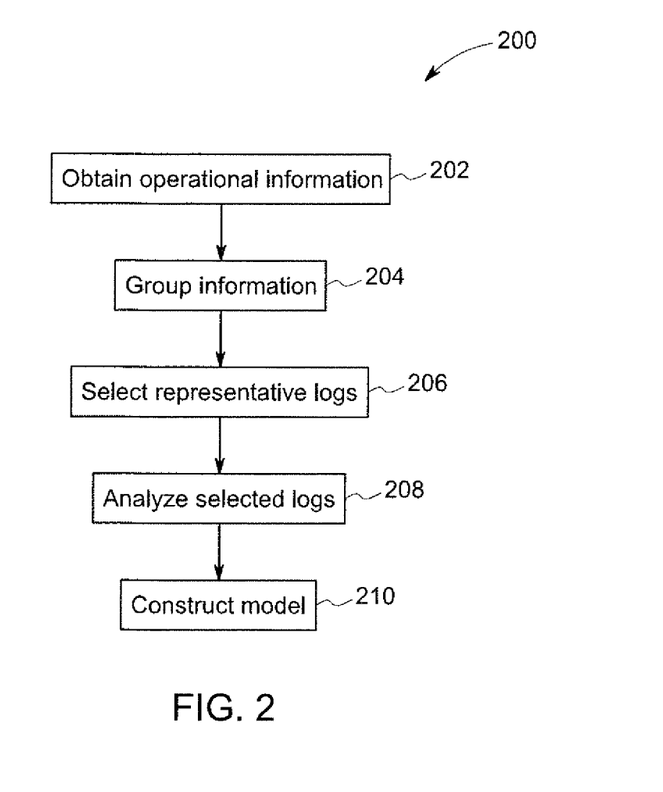
FIG. 2 is a flowchart of a method for developing a model in accordance with various embodiments.

FIG. 2 provides a flowchart of a method 200 for developing a model for analyzing or assessing a future health of a system using system-wide operational information in accordance with an embodiment. The system to be analyzed may include a number of functional systems or sub-systems joined by at least one common communication link. In various embodiments, the method 200, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 202, logs or other data or information is obtained. The collected data, for example, may include one or more logs of a communication link or system employed by the various functional systems or sub-systems. Further, the collected data may also include operational information for a particular functional system or sub-system as well.

At 204, the operational information obtained or collected at 202 is grouped. For example, the logs may be parsed and broken down into groups based on common features or keywords. For instance, the logs may be divided into blocks having predetermined numbers of lines, and histograms may be used to describe the blocks based on the occurrence of features and/or keywords within the blocks.

At 206, representative logs are selected. For example, after the blocks obtained by grouping at 204 are obtained (e.g., with blocks grouped together based on similarity as determined using, for example, histograms of features or keywords), a predetermined number of blocks from each group may be selected and analyzed.

At 208, the selected logs are analyzed. For example, the representative blocks may be analyzed to determine which representative blocks include fatal errors and/or precede blocks that include fatal errors (and/or precede blocks including fatal errors by a given number of lines or amount of time). A model may then be constructed at 210 correlating groups of blocks based on whether the representative blocks from each group correspond to fatal or non-fatal errors. In various embodiments, the grouping of operational information, selecting of representative logs, and/or analysis of selected logs may be performed using machine learning techniques. In some embodiments, supervised machine learning techniques may be employed, while in other embodiments, unsupervised machine learning techniques may be employed. With the model constructed, the model may be employed to determine a future health using subsequently obtained operational information. In various embodiments, the model may be modified over time for a given system or systems to take advantage of additionally obtained data, adjust for changes to the system, or the like.

Returning to FIG. 1, the depicted analysis module 120 is configured to use one or more models along with obtained operational information (e.g., operational information obtained via the systems analysis module 112) to determine a future health of one or more aspects of the multi-element system 102. For example, the analysis module 120 may be configured to determine the future health of the at least one of the multiple elements using a model based on historical information corresponding to the operational information corresponding to the system-wide operation of the multi-element system 102. Alternatively or additionally, the analysis module 120 may be configured to determine a future health of at least one of the multiple elements using operational information corresponding to a different one or more of the elements. Further still, in various embodiments, the analysis module 120 may be configured to determine a future health for the multi-element system 102 as a whole. The future health may correspond to an expected life or useful service time, for example a life or useful service time before an expected fatal error.

In various embodiments, the future health may correspond to a threshold of performance of a system-wide performance parameter. For instance, an expected life or useful life may correspond to an expected amount of time before a system-wide performance parameter drops below a threshold. For example, the multi-element system 102 may be configured as a healthcare system configured to obtain information corresponding to one or more physiological parameters of a patient and to provide a display based on the information. The information may be obtained by one or more functional systems 150 configured as sensors, detectors, or imaging systems, among others. The display may correspond to at least one state of the patient, and may be provided via a display system 170 configured, for example, as a workstation utilized by a practitioner. The system-wide performance parameter may be a skin-to-screen measure that corresponds to an amount of time from collection of the information corresponding to the one or more physiological parameters (e.g., collection via one or more functional systems 150) to the providing of a corresponding display (e.g., via the display system 170) based on the information collected at a given time.

Figure 3:
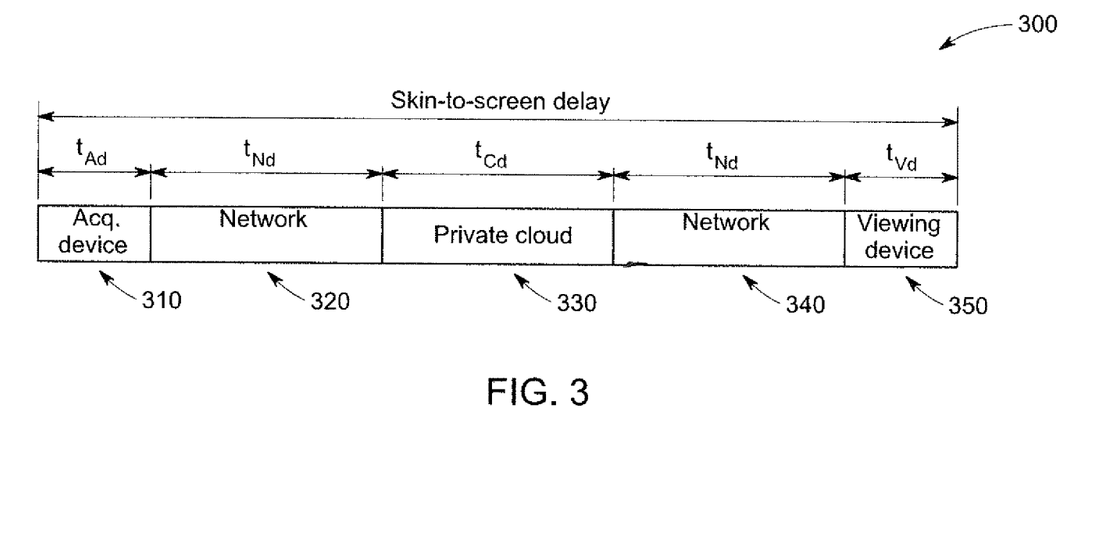
FIG. 3 is a view of an example of a skin to screen delay in accordance with various embodiments.

FIG. 3 shows an example of a system wide performance parameter in accordance with various embodiments. In FIG. 3, the system wide performance parameter is depicted as a skin to screen delay 300; however, other performance parameters may be utilized additionally or alternatively in various embodiments. In the illustrated embodiment, the skin to screen delay 300 includes various component delays. Namely, the depicted skin to screen delay 300 includes an acquisition delay 310, a first networking delay 320, a private cloud delay 330, a second networking delay 340, and a viewing delay 350. Thus, the total delay from an initial time of acquisition of particular information or a particular data set from a patient to the providing of a display corresponding to the information collected at an initial time may be understood as the sum of various delays of systems or devices used to transmit and/or process the information collected from the patient. In various alternate embodiments, additional delays (e.g., delays for transmission of information to one or more additional data processing modules, delays for processing by the one or more additional data processing modules, or delays for data acquisition by additional devices, among others) may be part of the skin to screen delay 300.

In the illustrated embodiment, the acquisition delay 310 corresponds to a delay associated with the acquisition of data. The acquisition delay 310, for example, may correspond to a delay of one or more acquisition devices, such as the data acquisition portion 152 of the data acquisition system 150. The depicted first networking delay 320 corresponds to a delay associated with communication of acquired data via a first network. The first network may be, for example, a wireless network having a delay associated with the transmission of data acquired by a data acquisition device or system. For example, the first networking delay 320 may correspond to a delay associated with communication of data collected by the data acquisition portion 152 to the communication link 140 via the networking portion 154 of the data acquisition system 150. In the illustrated embodiment, the private cloud delay 330 corresponds to a delay of one or more private cloud networking arrangements. For example, the private cloud delay 330 may correspond to a delay associated with the communication link 140. In various embodiments, the private cloud delay 330 may include a communication delay associated with transmission of information within the cloud as well as a processing delay associated with processing of information by one or more aspects of a cloud network or devices or systems associated with a cloud network. The depicted second networking delay 340 corresponds to a delay associated with communication of acquired data via a second network. The second network may be, for example, a wireless network having a delay associated with the transmission of data to the display system 170. For example, the second networking delay 340 may correspond to a delay associated with communication of data to the display portion 172 from the communication link 140 via the networking portion 174 of the display system 170. In the illustrated embodiment, the viewing delay 350 corresponds to a delay between the reception of information by a viewing device and the display of the received information by the viewing device. For example, the viewing delay 350 may correspond to a delay associated with the display system 170. In various embodiments, the viewing delay 350 may also include a delay associated with the processing of information to be displayed.

Thus, in various embodiments, a system-wide performance measure, such as a skin to screen measure may be employed to measure system performance of a system including multiple devices or systems communicatively linked to provide a functional result (e.g., providing a display corresponding to physiological and/or anatomical data collected from a patient). Further still, the system-wide performance measure may be used to define a threshold associated with a future health, and the future value of the system-wide parameter for a given system may be estimated using, for example, a model as discussed herein. For example, a predetermined maximum allowable skin to screen delay may be defined or selected, and a determined future health of a system may include a projected or estimated time at which the skin to screen delay will exceed the predetermined maximum allowable time. Additionally or alternatively, the value of a present or future system-wide performance parameter such as skin to screen delay may be used to control operation of one or more aspects of a system. For example, if it is determined that a skin to screen delay exceeds a predetermined threshold (or is projected to exceed a predetermined threshold), operation of one or more aspects of a system may be altered. For example, a quantity and/or resolution of data acquired by a data acquisition device may be reduced to allow for shorter acquisition, transmission, processing, and/or display delays.

Returning to FIG. 1, the remedial module 122 of the illustrated embodiment is configured to perform one or more remedial acts or tasks to mitigate or otherwise address one or more issues regarding the future health of one or more aspects of the multi-element system 102. The remedial module 122, for example, may obtain information corresponding to a present or future health (e.g., an expected life, current value of a system-wide performance parameter, estimated future value of a system-wide performance parameter, or the like) of one or more aspects of the multi-element system from the determination module 116, and determine one or more remedial acts or tasks using the information obtained from the determination module. In various embodiments, the remedial module 122 may be configured to provide notice, for example to a practitioner or health care organization, if a fatal error is expected within a given amount of time and/or if a system-wide performance parameter is at a predetermined threshold or expected to be at a predetermined threshold at a given time.

In various embodiments, the remedial module 122 may be configured to identify at least a portion of the multi-element system associated with a health issue corresponding to the future health of the at least one element of the multi-element system. For example, a model employed by the determination module 116 may also be configured to identify a particular cause of a fatal error and/or a potential location of a fatal error based on operational information obtained by the determination module 116, and may be configured to provide identification information corresponding to the fatal error to the remedial module 122. The remedial module 122 may use the identification information to perform a remedial task, such as one or more of notifying an operator of the cause or location of the expected fatal error, or shifting operation of the multi-element system 102 to eliminate, minimize, or reduce usage of the aspect of the multi-element system 102 associated with the expected fatal error.

In various embodiments, the remedial module 122 may be configured to direct a modification of at least a portion of the multi-element system. As used herein, a modification may be directed by the remedial module 122 via an autonomous (e.g., without user intervention or assistance) implementation of the change via the remedial module 122, or, as another example, a modification may be directed by the remedial module 122 via a message or prompt to an operator or other entity providing a suggested modification for implementation by the operator or other entity. The modification may be an operational modification and/or a structural modification.

An operational modification may include, for example, a change to a setting or other use of a functional system (or aspect thereof) or other aspect of the multi-element system 102. For example, if a system-wide performance parameter such as a delay time is at or approaching a predetermined threshold, a quantity or resolution of data collected, processed, and/or displayed may be reduced to mitigate the delay time. For example, for a healthcare setting where a multi-element system may include a data acquisition element or sub-system, a processing element or sub-system, and a display element or sub-system, the multi-element system may be configured to provide a display at a first, relatively high resolution using information obtained by the data acquisition element or sub-system. However, if the skin to screen delay exceeds a threshold or is about to exceed a threshold, the remedial module 122 may direct the data acquisition element or sub-system to collect less data and/or direct the display element or subsystem (and/or the processing element or sub-system) to process or display the information at a second, relatively low resolution. Thus, the time or delay to acquire the information, process the information, display the information, and/or transmit the information may be reduced by operating one or more aspects of the multi-element system to perform under different settings or at a different capacity then previously used, in order to mitigate a reduced health or future health of the multi-element system. In various embodiments, the operation of a first aspect of the multi-element system 102 may be modified to address a concern associated with a different aspect of the multi-element system. For example, if there is a concern with the function of a display element, an amount of data acquired or processed by other aspects of the multi-element system may be reduced to ease the requirements of the display element.

A structural modification may include one or more of a repair, an upgrade, a replacement, or the like, of one or more components of the multi-element system 102. For example, the determination module 116 and/or the remedial module 122 may determine whether a health issue or future health issue is related to a fault, or if the issue is related to an insufficient capacity. If the issue is related to a fault, the remedial module 122 may direct (e.g., by providing a prompt to an operator or other user) a repair or replacement of an identified component (or components) associated with the fault. If, however, the issue is related to an insufficient capacity, the remedial module 122 may direct (e.g., by providing a prompt to an operator or other user) an upgrade to an identified component or components, and/or the addition of one or more additional components to a system. For example, the remedial module 122 may direct the addition of an additional server to a multi-element system if it is determined the multi-element system has insufficient processing capacity.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

Figure 4:
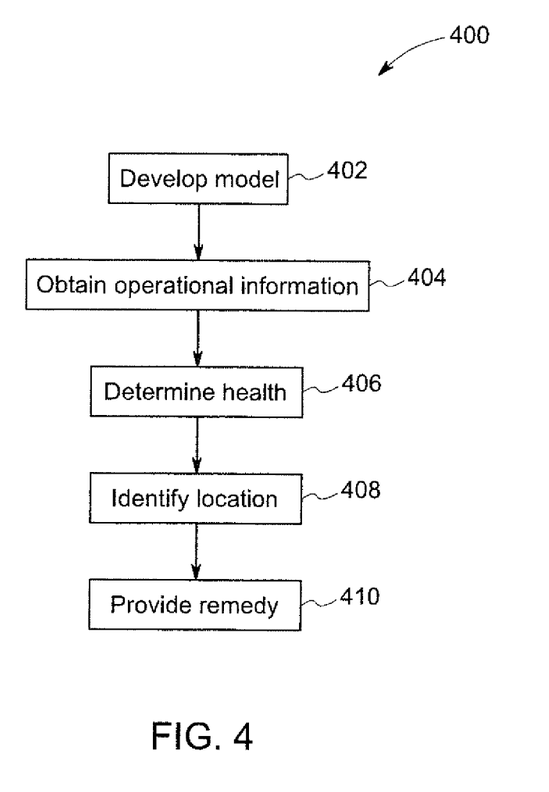
FIG. 4 is a flowchart of a method for assessing a future health associated with a multi-element system in accordance with various embodiments.

FIG. 4 provides a flowchart of a method 400 for analyzing or assessing the health and/or future health of a multi-element system in accordance with an embodiment. The multi-element system may include multiple elements communicatively coupled by at least one common communication link. For example, the system to be analyzed may include one or more of a functional system, an information system (for example, an information system configured to operate in conjunction with a functional system), and a communication link (e.g., via a cloud network structure) configured to communicatively couple other elements of the multi-element system, and may include a number of sub-systems. In various embodiments, the method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 402, a model is developed. In various embodiments, the model may utilize operational information corresponding to system-wide operation of a multi-element system as an input. In some embodiments, the model may also utilize operational information corresponding to operation of a sub-system, element, portion, or other aspect of a multi-element system. The model, for example, may be based on historical data for a given system or type of system. In various embodiments, the model may be constructed using machine learning techniques (e.g., supervised or unsupervised machine learning) based on historical operational information include data sets such as logs of computer or processing activity. In various embodiments, a model may be a physics based model developed using known relationships between aspects of the multi-element system.

At 404, information is obtained for use in determining a state of the multi-element system (or aspect thereof), such as a present or future health. The information in various embodiments includes operational information corresponding to a system-wide operation of the multi-element system. For example, the system-wide information may include information corresponding to the system as a whole and/or information corresponding to the operation of one or more communication links that join various elements or systems (e.g., functional systems such as the data acquisition system 150, the processing system 160, and/or the display system 170). The operational information may include data sets or logs of computing or processing activity. Further, in various embodiments the information may include additional operational information that corresponds to an operation of a sub-system, element, portion, or other aspect of a multi-element system. For example, additional operational information may include operational information corresponding to one or more functional systems such as the data acquisition system 150, the processing system 160, or the display system 170.

At 406, a health of one or more aspects of the multi-element system is determined. The health may be a current and/or estimated future health of the multi-element system and/or an aspect thereof. In various embodiments, the health is determined using one or more models (e.g., a model developed at 404), and using the operational information obtained at 404 as an input to the one or more models. Determining the future health, for example, may include determining an expected life for the multi-element system. Additionally or alternatively, determining the future health may include determining a threshold of performance of a system wide performance parameter (e.g., a skin to screen value).

At 408, a location associated with a fault is identified. The location may be identified, for example, by a remedial module (e.g., the remedial module 122) and/or a determination module (e.g., the determination module 116) of a systems prognostics module (e.g., the system prognostics module 110). For example, at least a portion of the multi-element system associated with a health issue corresponding to the future health of the at least one element of the multi-element system may be identified. In various embodiments, the location identified may correspond to an aspect of the multi-element system that will be impacted by a fault, or for which a performance parameter is determined. Alternatively or additionally, the location identified may correspond to an aspect of the multi-element system that will cause or be the source of a fault or other error.

At 410, a remedy is provided. For example, a remedial module (e.g., the remedial module 122) may direct an operational and/or structural change to one or more aspects of the multi-element system based on one or more of a current health, a future health, or an identified fault. In various embodiments, the remedial module may direct a change by autonomously implementing a change. In some embodiments, the remedial module may direct a change via a prompt or other message describing or otherwise corresponding to a proposed change to be implemented by an operator or different module or sub-system, among others.

Thus, various embodiments provide for the analysis of system-wide operation for a multi-element system, and the determination of a future health of one or more aspects of the multi-element system based on operational information corresponding to the multi-element system. The future health may be, as one example, an estimated life, or, as another example, a determined or estimated value of a system-wide performance parameter. In various embodiments, one or more models constructed using machine learning techniques, with the models designed to use operational information as an input and to provide one or more future health as outputs. In various embodiments, the future health of a particular aspect of a multi-element system may be identified. Further still, in various embodiments, a structural or operational change may be directed to address an issue or concern associated with a future health of the multi-element system.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A prognostics module comprising:
   at least one processor and a tangible and non-transitory memory, the at least one processor performing operations based on instructions stored on the tangible and non-transitory memory, the at least one processor configured to:
   obtain operational information corresponding to a system-wide operation of a multi-element system comprising multiple elements communicatively coupled by at least one common communication link, wherein each element of the multi-element system comprises at least one of a device or facility; and
   determine a future health of at least one of the multiple elements of the multi-element system using the operational information corresponding to the system-wide operation of the multi-element system, wherein the at least one processor is configured to determine the future health of the at least one of the multiple elements based on an aggregate analysis of plural components of the multi-element system.

2. The prognostics module of claim 1, wherein the at least one processor is configured to determine an expected life for the multi-element system.

3. The prognostics module of claim 1, wherein the future health corresponds to a threshold of performance of a system-wide performance parameter.

4. The prognostics module of claim 3, wherein the multi-element system is configured as a healthcare system configured to obtain information corresponding to one or more physiological parameters of a patient and to provide a display based on the information, the display corresponding to at least one state of the patient, and wherein the system-wide performance parameter comprises a skin-to-screen measure corresponding to an amount of time from collection of the information corresponding to the one or more physiological parameters to providing the display based on the information.

5. The prognostics module of claim 1, wherein the at least one processor is configured to determine the future health of the at least one of the multiple elements using a model based on historical information corresponding to the operational information corresponding to the system-wide operation.

6. The prognostics module of claim 5, wherein the model is constructed using machine learning techniques.

7. The prognostics module of claim 1, wherein the operational information includes logs of system activity.

8. The prognostics module of claim 1, wherein the at least one processor is further configured to identify at least a portion of the multi-element system associated with a health issue corresponding to the future health of the at least one element of the multi-element system.

9. The prognostics module of claim 1, wherein the at least one processor is further configured to direct a modification of at least a portion of the multi-element system.

10. The prognostics module of claim 1, wherein the communication link is configured to communicatively link the multiple elements via a cloud network structure.

11. The prognostics module of claim 1, wherein the operational information comprises security information corresponding to cyber or other threats to one or more aspects of the multi-element system.

12. A method comprising:
   obtaining operational information corresponding to a system-wide operation of a multi-element system comprising multiple elements communicatively coupled by at least one common communication link, wherein each element of the multi-element system comprises at least one of a device or facility; and
   determining, at one or more processing modules of a prognostics system, a future health of at least one of the multiple elements of the multi-element system using the operational information corresponding to the system-wide operation of the multi-element system, wherein determining the future health of the at least one of the multiple elements of is performed based on an aggregate analysis of plural components of the multi-element system.

13. The method of claim 12, wherein the future health corresponds to a threshold of performance of a system-wide performance parameter.

14. The method of claim 12, further comprising identifying, at the one or more processing modules of the prognostics system, at least a portion of the multi-element system associated with a health issue corresponding to the future health of the at least one of the multiple elements of the multi-element system.

15. The method of claim 12, further comprising directing, from the one or more processing modules of the prognostics system, a modification for at least a portion of the multi-element system.

16. The method of claim 12, wherein the determining the future health comprises determining an expected life for the multi-element system.

17. A tangible and non-transitory computer readable medium comprising one or more computer software modules configured to direct one or more processors to:
obtain operational information corresponding to a system-wide operation of a multi-element system comprising multiple elements communicatively coupled by at least one common communication link, wherein each element of the multi-element system comprises at least one of a device or facility; and
determine a future health of at least one of the multiple elements of the multi-element system using the operational information corresponding to the system-wide operation of the multi-element system, wherein determining the future health of the at least one of the multiple elements of is performed based on an aggregate analysis of plural components of the multi-element system.

18. The computer readable medium of claim 17, wherein the future health corresponds to a threshold of performance of a system-wide performance parameter.

19. The computer readable medium of claim 17, wherein the computer readable medium is further configured to direct the one or more processors to identify at least a portion of the multi-element system associated with a health issue corresponding to the future health of the at least one of the multiple elements of the multi-element system.

20. The computer readable medium of claim 17, wherein the computer readable medium is further configured to direct the one or more processors to direct a modification for at least a portion of the multi-element system.

21. The computer readable medium of claim 17, wherein the computer readable medium is further configured to direct the one or more processors to determine an expected life for the multi-element system.

* * * * *